L. H. LANIER.
RECEPTACLE FOR HOLDING AND DELIVERING BATTER FOR ICE CREAM CONE MACHINES.
APPLICATION FILED MAY 31, 1910.
988,196.
Patented Mar. 28, 1911.
2 SHEETS—SHEET 1.
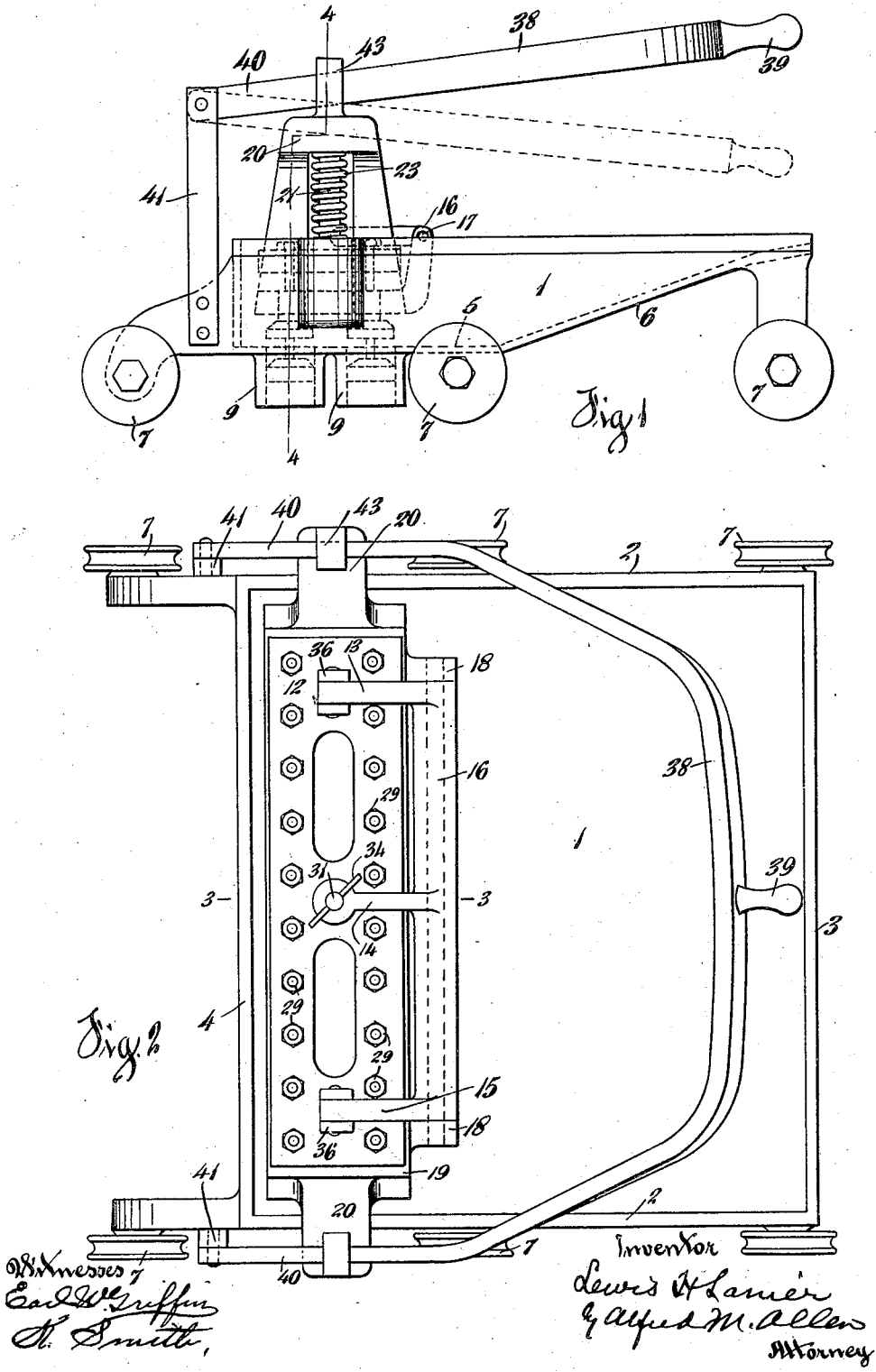

L. H. LANIER.
RECEPTACLE FOR HOLDING AND DELIVERING BATTER FOR ICE CREAM CONE MACHINES.
APPLICATION FILED MAY 31, 1910.
988,196.
Patented Mar. 28, 1911.
2 SHEETS—SHEET 2.
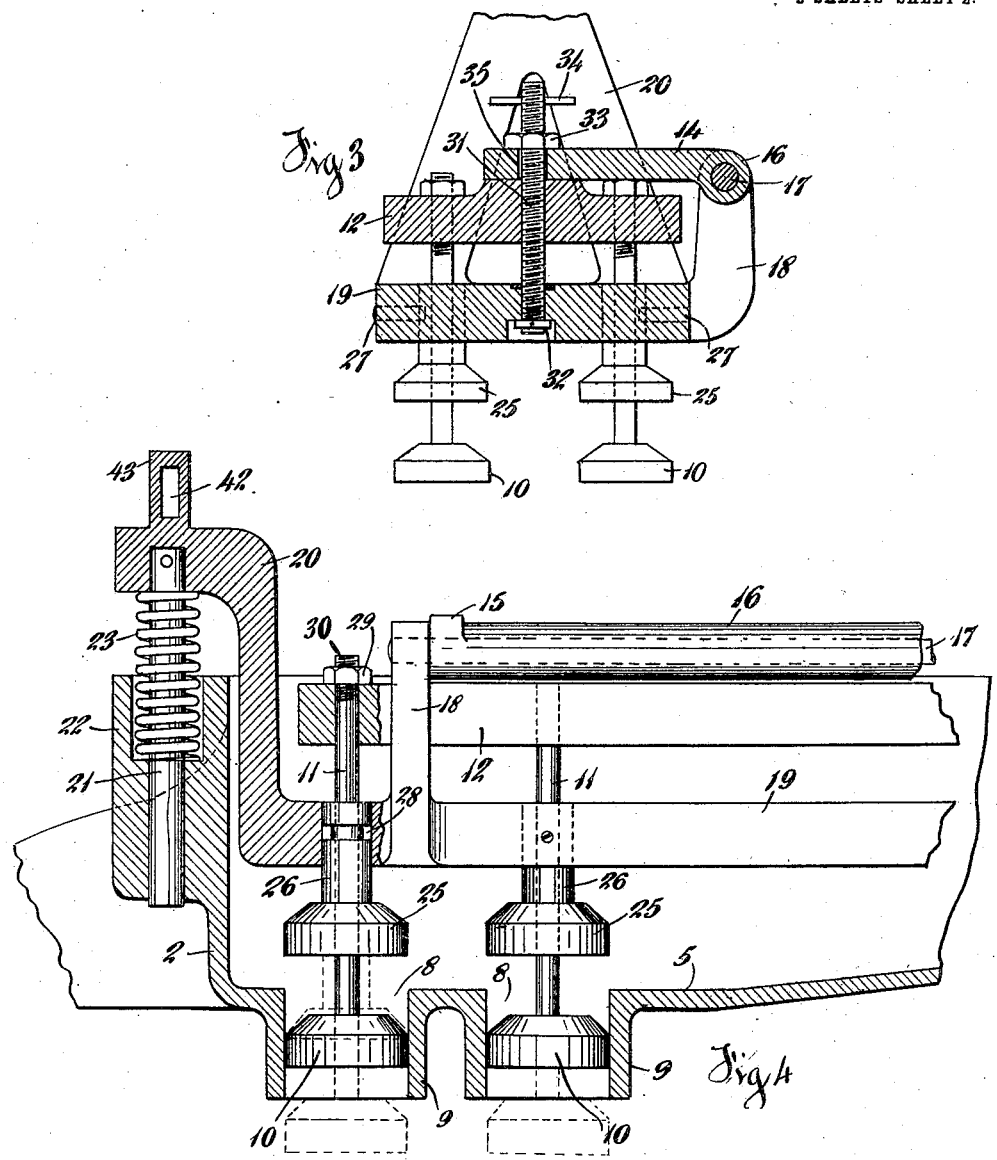

UNITED STATES PATENT OFFICE.

LEWIS H. LANIER, OF NEWPORT, KENTUCKY, ASSIGNOR OF ONE-HALF TO LUDWIG L. STRICKER, OF CINCINNATI, OHIO.

RECEPTACLE FOR HOLDING AND DELIVERING BATTER FOR ICE-CREAM-CONE MACHINES.

988,196. Specification of Letters Patent. Patented Mar. 28, 1911.

Application filed May 31, 1910. Serial No. 564,208.

*To all whom it may concern:*

Be it known that I, LEWIS H. LANIER, a citizen of the United States, and a resident of the city of Newport, in the county of Campbell and State of Kentucky, have invented certain new and useful Improvements in Receptacles for Holding and Delivering Batter for Ice-Cream-Cone Machines, of which the following is a full, clear, and exact description, reference being had to the accompanying drawings, forming a part of this specification.

The object of my invention is to provide a receptacle for holding batter with which a measured quantity of batter can be delivered to the series of molds of an ice cream cone machine.

The invention consists of that certain novel construction and arrangement of parts whereby there shall be simultaneously delivered to all of the molds of such cone making machine the exact quantity of batter required for each cone and in which the quantity of batter to suit the special requirements may be varied and accurately regulated and controlled, to prevent waste and to furnish the necessary thickness of cone desired.

The invention is especially designed for use with that type of cone machine shown and described in my pending application for Letters Patent Serial Number 545,164, but it will be readily understood that with mere mechanical changes and sizes of parts, the receptacle can be adapted for other machines without departing from the spirit of my invention.

In the drawings, Figure 1 is a side elevation of my improved device. Fig. 2 is a top plan view of the same. Fig. 3 is a transverse section of the measuring and delivering device taken on line 3, 3, of Fig. 2. Fig. 4 is a longitudinal section of the same with a portion of the receptacle taken on line 4, 4, of Fig. 1.

1 is a pan or receptacle of any suitable size and shape for holding the batter. In the form illustrated I have employed a rectangular vessel with side walls 2, 2, front 3 and rear wall 4 and with bottom 5 inclined upwardly toward the front at 6. For convenience in handling, the receptacle is mounted on rollers or casters 7, 7, three wheels on a side suitably journaled in lugs, depending from the sides of the receptacle.

The batter receptacle is sufficiently wide to extend over the entire series of molds of the cone baking machine, and in the bottom 5 of the receptacle a series of circular apertures 8, 8, are formed, one for each mold, and of a diameter about equal to the diameter of the mold, and around each aperture a short depending sleeve 9, 9, is formed so as to furnish a short cylinder for the reception of the plungers 10, 10, one for each cylinder, and of a diameter to form a snug fit with the wall of the cylinder. These plungers 10 are suspended by plunger rods 11 from a plate 12 extending horizontally across the rear portion of the receptacle over the series of openings 8 for the delivery of the batter, and this plate 12 is itself supported by three arms 13, 14 and 15, secured to a tube or sleeve 16 pivoted on a rod 17 alongside of and lengthwise with the plate 12. The rod 17 is mounted in the upwardly extending side arms 18, 18, of a plate 19 extending underneath the plate 12 and parallel thereto, and this plate 19 is provided with a yoke 20 at each end which yokes are hung on rods 21, 21, which pass down loosely through lugs 22, 22, on the side wall of the receptacle. The yokes and plates 19 and 12 are held up by coiled springs 23 mounted on the rods 21 and bearing between the wall of the receptacle and the under surface of the yokes.

25, 25, are a series of plungers corresponding in size and shape to the plungers 10, and these plungers are formed with sleeves 26, 26, secured in suitable openings in the plate 19 by pins 27 in the plate 19 which engage an annular groove 28 in the sleeve, so that for each plunger 25 there will be some play or lost motion. The rods 11 of the lower series of plungers 10 pass up loosely through the plungers 25 and sleeves 26 and are held in position by nuts 29 on the screw threaded ends 30 of the rods 11 where they pass through the plate 12.

The plate 19 is held in adjustable horizontal position with reference to the plate 12 by the screw threaded rod 31 which passes loosely through the arm 14 and is threaded through the plate 12 and thence passes loosely through the plate 19 where it is held by the washer 32 in a recess in the under surface of the plate 19, the rod 31 above by the nut 33 bearing on the upper surface of the arm 14. The screw 31 is turned by the handle 34 and it is evident that as the screw is turned the plate 12 will be adjusted toward or away from the plate 19. The loose opening 35 in the arm 14 through which the rod passes is of sufficient diameter to permit the arm 14 to swing on the shaft 17 during this adjustment. The other arms 13 and 15 which support the plate 12 are pivoted in ears 36 on the plate 12.

It will be evident that as the plate 12 is adjusted toward or away from the plate 19, the series of plungers 25 will be correspondingly adjusted toward or away from the plunger 10, and it will be seen that the adjustment of the plunger will be accomplished simultaneously for the entire series and the distance apart of the plungers can be very accurately and instantaneously regulated.

The entire series of plungers and plates are arranged to be depressed as an entirety by the lever bar 38 provided with a handle 39. The two side arms 40, 40 of this lever bar are pivoted in upright supports 41 secured to the frame, and these side arms pass through slots 42 in the studs 43 on the yokes 20, so that as the lever is depressed, the plungers will be depressed, and when the lever is released the plates and plungers will be raised to normal position by the coiled springs 23, 23, and this normal position is attained with the lower series of plungers 10 engaging in the cylinders 9, 9, and with the plungers 25 inside the receptacle. In this normal position, the receptacle is filled with batter, the apparatus run in on the rollers until the openings in the cylinders 9, 9, are above the molds to be filled with batter. The operator then depresses the lever which brings the plungers 25 into engagement with the openings 8 before the lower plungers have been depressed from the cylinders 9. A definite quantity of batter will therefore be held between the bottom surface of the plungers 25 and the top surface of the plungers 10. The plungers are then depressed until the plungers 10 leave the cylinders and the measured quantity will run out to be dropped into the molds. The exact quantity required can very readily be obtained by manipulating the adjusting screw 31 as heretofore described.

With the cylinders 9 of proper size to contain sufficient batter for any mold desired, the amount delivered can be regulated with the greatest accuracy and uniformity by adjusting the plungers toward or away from each other, the only requirement being that one of the sets of plungers shall at all times be in engagement with the cylinders to shut off the openings through the bottom of the batter receptacle.

Having thus described my invention, what I claim as new and desire to secure by Letters Patent, is:

1. In an apparatus of the character specified, a receptacle, provided with a series of measuring tubes opening through a wall of the receptacle and an inner and an outer series of plungers in operative alinement with each other adapted to engage the tubular openings, an inner and an outer plunger for each opening and arranged in relatively fixed relation with each other whereby one set of plungers may engage said openings when the other set are released therefrom and means for advancing the plungers to discharge the material deposited in the tubes therefrom.

2. In an apparatus of the character specified, a receptacle, provided with a series of measuring tubes opening through the bottom of the receptacle, and an upper and a lower series of plungers adapted to engage the tubular openings, and arranged in relatively fixed relation with each other whereby one set of plungers may engage said openings when the other set are released therefrom, and means for advancing the plungers simultaneously to discharge the material deposited in the tubes therefrom.

3. In an apparatus of the character specified, a receptacle, provided with a series of measuring tubes opening through the bottom of the receptacle, and an upper and a lower series of plungers adapted to engage the tubular openings, an upper and a lower plate upon which said sets of plungers are respectively mounted with means for adjusting said plates toward and away from each other to fix the relative position of the two sets of plungers with one set engaging said tubes, and means for advancing said plates to actuate the plungers to discharge the material deposited in the tubes therefrom.

4. In an apparatus of the character specified, a receptacle, provided with a series of measuring tubes opening through the bottom of the receptacle, and an upper and a lower series of plungers adapted to engage the tubular openings, an upper and a lower plate upon which said sets of plungers are respectively mounted, the lower set of plungers suspended by rods, and the upper set provided with apertures through which the rods pass to maintain the plungers in alinement, means for adjusting the plates toward and away from each other to fix the relative positions of the plungers with one set in engagement with said tubes, yokes for suspending the plates from the frame of the receptacle, and a lever for depressing the yokes to actuate the plunger to discharge the material deposited in the tubes therefrom.

LEWIS H. LANIER.

Witnesses:
ARTHUR H. EWALD,
K. SMITH.

Copies of this patent may be obtained for five cents each, by addressing the "Commissioner of Patents, Washington, D. C."